United States Patent [19]
Burkhart et al.

[11] Patent Number: 5,223,978
[45] Date of Patent: Jun. 29, 1993

[54] HYBRID DIFFRACTIVE/REFRACTIVE LENS

[75] Inventors: Gordon H. Burkhart, St. Louis; Ronald A. Ferrante, St. Charles, both of Mo.

[73] Assignee: McDonnell Douglas Corporation, St. Louis, Mo.

[21] Appl. No.: 710,362

[22] Filed: Jun. 3, 1991

[51] Int. Cl.$^5$ .................. G02B 27/44; G02B 5/18; G02B 3/08
[52] U.S. Cl. .................. 359/569; 359/566; 359/641; 359/718; 359/719; 359/742
[58] Field of Search ............ 359/641, 741, 742, 565, 359/566, 569, 718, 719, 571, 574, 575, 558, 619

[56] References Cited

U.S. PATENT DOCUMENTS

| | | | |
|---|---|---|---|
| 4,668,053 | 5/1987 | Nishi et al. | 359/413 |
| 4,846,552 | 7/1989 | Veldkamp et al. | 359/900 X |
| 4,895,790 | 1/1990 | Swanson et al. | 359/369 X |
| 4,902,113 | 2/1990 | Ishiwata | 359/641 |
| 5,044,706 | 9/1991 | Chen | 359/565 |

OTHER PUBLICATIONS

Cox, J. Allen "Binary Optics Offers New Freedom to Systems Designers" *Laser Focus World* Aug. 1989 pp. 47-52.

Maschmeyer, Richard O., et al. "Precision Molded-glass Optics" *Applied Optics* vol. 22, No. 16, Aug. 15, 1983 pp. 2410-2412.

*Primary Examiner*—Bruce Y. Arnold
*Assistant Examiner*—David R. Parsons
*Attorney, Agent, or Firm*—Guy R. Gosnell; Benjamin Hudson, Jr.; Timothy H. Courson

[57] ABSTRACT

A hybrid lens for collimating, with low optical aberrations, an asymmetrically diverging input wavefront. The hybrid lens has a front surface which serves to diffract the input wavefront and a back surface which serves to refract the wavefront. Embodiments are described comprised of either a single plano-convex optical lens or a pair of lenses, one of which is a plano lens and the other or which is plano-convex. In either alternative, the convex surface is spherical. The planar surface of the single plano-convex lens or the back lens surface of the plano lens is optimized such that each ray of light from a diverging input light source will travel the same optical path length in reaching a predetermined collimation plane. This optimization is done by means of binary optic technology which uses a reactive-ion etch to form the requisite eight-level binary optic diffraction pattern. The widths of the fringe patterns generated by the three masks determined by calculations of the optical path difference between on-axis and off-axis rays which are traced through the hybrid lens.

17 Claims, 1 Drawing Sheet

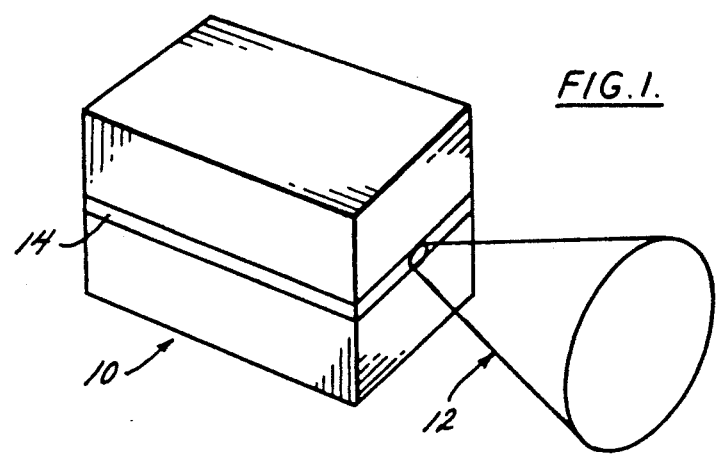
FIG. 1.
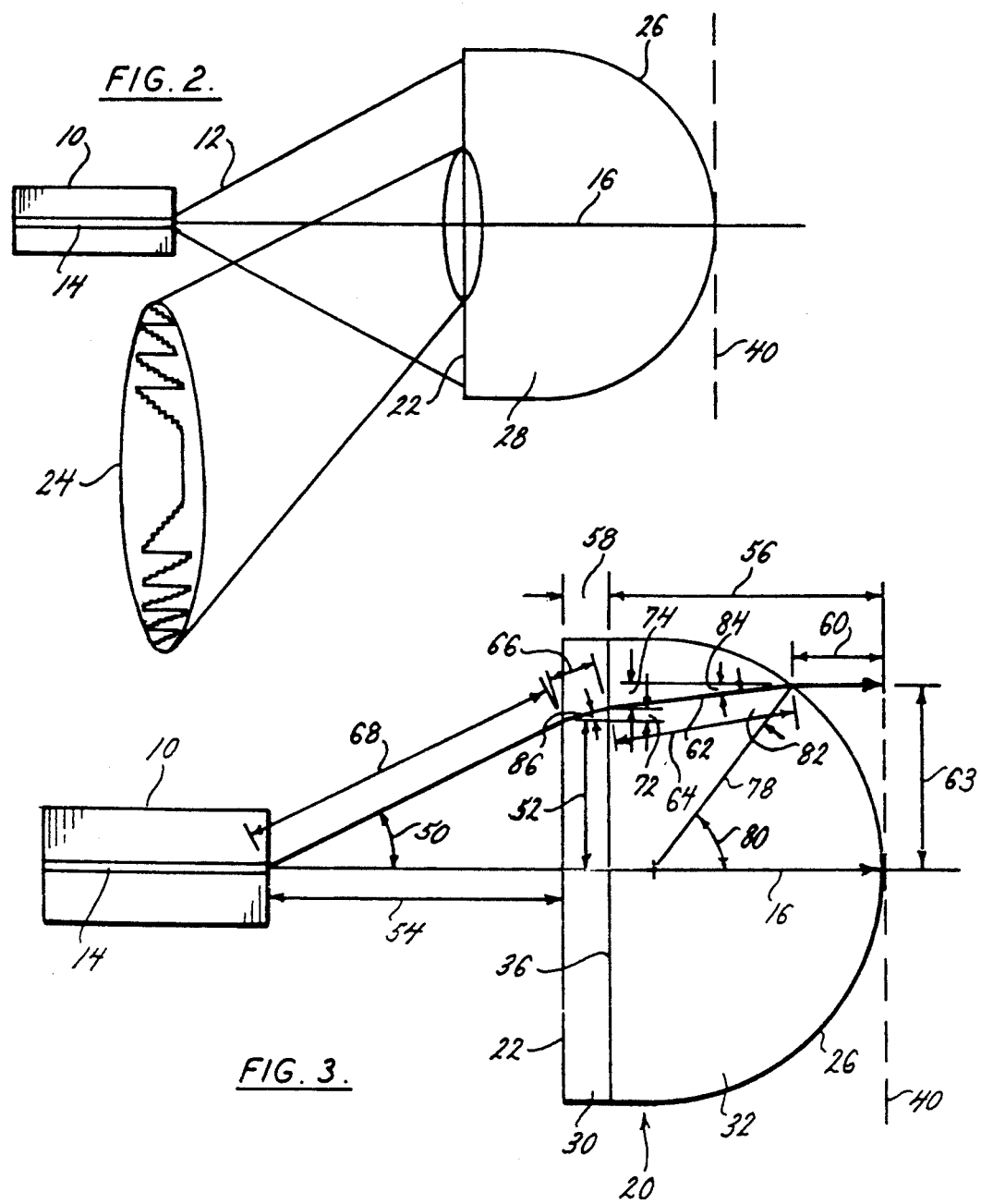
FIG. 2.
FIG. 3.

HYBRID DIFFRACTIVE/REFRACTIVE LENS

BACKGROUND OF THE INVENTION

The present invention relates generally to a hybrid lens for collimating a divergent input wavefront with low optical aberrations and more particularly to a hybrid lens whereby a first surface of the lens diffracts the divergent wavefront and a second surface of the lens refracts the divergent wavefront so as to collimate the lens' output with low optical aberrations.

Many optical sources, such as diode lasers, produce asymmetrically diverging output beams. Diode lasers are currently utilized in many applications. Many of these applications require a collimated diode laser output with low optical aberrations even though diode lasers typically produce asymmetrically diverging output beams. In many instances, this asymmetric divergence may be quite fast, such as an 80° output fan or larger, from the individual diode laser.

There have been a variety of proposed optical design solutions to collimate, with low optical aberrations, the asymmetrically diverging wavefronts. One proposed solution is to mold plastic or glass aspheric optical elements in the shape desired in order to collimate the diverging output beam. An example of such a molded glass optical element is discussed in "Precision Molded-Glass Optics," written by R. Maschmeyer, et al. in Applied Optics, vol. 22, No. 16, on page 2410 in 1983. The glass optic elements which have been molded are generally limited in their ability to collimate a divergent output beam, however, due to stresses inherent in the glass element from the molding process. Additionally, molded plastic optical elements, while easier to mold than the relatively difficult to mold glass elements, tend to deform when subjected to high temperatures. Such deformation limits the plastic elements ability to collimate diode laser's output since high temperatures would often be experienced when the optical element was placed adjacent to the emitting facet of the diode laser.

An alternative method collimating a divergent wavefront involves the use of gradient index (GRIN) lenses such as the lens described in U.S. Pat. No. 4,668,053 which issued to Hissmi Nishi, et al. on May 26, 1987. While such GRIN lenses may be capable of collimating a divergent wavefront, their manufacture is typically complex. This complexity is due to the traditional methods of producing a GRIN lens by either chemical leaching of a glass rod, such that the refractive index is varied along the radius of the rod, or chemical vapor deposition of layers of particles having varied refractive indices, such that there is a concentric variation in the rod's refractive index. Thus, due to the typically complex methods for fabricating a GRIN lens, the utilization of such lenses is somewhat limited since they are quite expensive and require a sophisticated manufacturing process.

Another approach for producing an optical element for collimating a divergent output is illustrated in U.S. Pat. No. 4,895,790 (hereinafter the '790 patent) which issued to Gary J. Swanson, et al. on Jan. 23, 1990 which proposes the manufacture of diffraction-based, computer-generated binary optical elements. While such a method of manufacturing is discussed in the '790 patent, the actual process for determining the profile of a binary optical element is not discussed so as to enable one skilled in the art to construct a binary optical lens element to collimate a divergent input.

Therefore it would be desirable to provide an optical element which is capable of collimating, with low optical aberrations, a highly divergent wavefront. Furthermore, it would be desirable if such collimating optical elements were efficient such that a substantial percentage of the divergent input wavefront was retained in the collimated output.

SUMMARY OF THE INVENTION

There is provided by this invention a hybrid lens for collimating, with low optical aberrations, an asymmetrically diverging input wavefront. The hybrid lens has a front surface which serves to diffract the input wavefront and a back surface which serves to refract the wavefront. The hybrid lens may be formed from either a single plano-convex optical lens or from a pair of lenses, one of which is a plano lens and the other or which is plano-convex, which are attached to one another following their processing so as to form a single optical element. In either alternative, the convex surface is spherical.

The planar surface of the single plano-convex lens or the back lens surface of the plano lens which is thereinafter attached to a plano-convex lens is optimized such that each ray of light from a diverging input light source will travel the same optical path length in reaching a predetermined collimation plane. This optimization is done by means of binary optic technology which uses a reactive-ion etch to form the requisite diffraction pattern on the planar lens surface. The widths of the fringe patterns generated by the three masks utilized to form a eight level binary optic pattern are determined by calculations of the optical path difference between on-axis and off-axis rays which are traced through the hybrid diffractive/refractive lens.

BRIEF DESCRIPTION OF THE DRAWINGS

FIG. 1 is a perspective view of a diode laser illustrating its asymmetric diverging fan output;

FIG. 2 is a side view of a plano-convex lens incorporating the principle of this invention; and FIG. 3 is a side view of a plano-convex lens comprised of a pair of lenses to calculate the optical path difference for a pair of rays which is utilized in FIG. 2;

DETAILED DESCRIPTION OF THE PREFERRED EMBODIMENT

As shown in FIG. 1, the output of a diode laser 10 typically forms an asymmetrically diverging fan 12. The asymmetrical divergence of a diode laser with an active region 14 located in a horizontal layer produces a much larger divergence along the vertical axis than along the horizontal axis. The slow horizontal divergence may thus be collimated with spherical optical elements with few resulting aberrations, however, the collimation of the fast vertical divergence requires optical elements with an increased optical power, and thus a much lower F/#, which generally results in increased optical aberrations in the collimated output.

The present invention, as illustrated in FIG. 2, is a hybrid lens 20 for collimating, with few optical aberrations, the fast axis of an asymmetrically diverging input wavefront, such as the output beam of a diode laser 10. The hybrid lens 20 has a back lens surface 22 on which a binary optic lens element 24 is etched to diffract the incoming wavefront. The hybrid lens 20 also has a spherical front lens surface 26 to refract the exiting wavefront. The hybrid lens 20 may be comprised of a pair of lens, a plano lens 30 and a plano-convex cylindrical lens 32 as illustrated in FIG. 3. The binary optic lens pattern 24 could then be etched directly on the back surface 22 of the plano lens 30 which would be thereafter cemented to the planar side 36 of the plano-convex cylindrical lens 32 to form the hybrid lens 20. Alternatively, the binary optic lens pattern 24 could be etched directly on the back surface 22 of a single plano-convex cylindrical lens 28 as shown in FIG. 2.

The spherical front lens surface 26 in either embodiment is selected to have a radius R, and an index of refraction n if the hybrid lens 20 is formed from a single plano-convex cylindrical lens 28, however, if the hybrid lens should be comprised of a pair of distinct lens as shown in FIG. 3 the plano lens 30 should have an index of refraction $n_p$ and the plano-convex lens 32 should have an index of refraction $n_L$. The radius R and the indices of refractions should be selected such that the resulting optical power of the lens or lens combination is sufficient to collimate the output of a diode laser 10 with a known divergence. Once the radius R and the indices of refraction n of the initial lens configuration are known, the calculations may be performed to determine the binary lens patter 24 which must be etched on the back lens surface in order to collimate the divergent wave front with low optical aberrations.

As shown in FIG. 2, the binary optical pattern to be etched upon the back lens surface 22 is determined by the results of equations involving rays of light traced from the emitting facet of the diode laser 10 through the lens into a point on a collimation plane 40. The location of the collimation plane 40 determines the position at which the optical wavefront will be collimated. Due to the outcome of the equations hereinafter discussed, the phase of all the rays of light will be equal at the point in which they intersect the plane 40. The collimation plane 40 may be located at any angle or may simple be a point with a resulting alteration in the equations for the optical path length due to a variance in the binary optical pattern 24 etched upon the back lens surface 22 to ensure that each ray at the diverging input light travels a equal optical path length from its source to its collimation location. A collimation plane 40 oriented perpendicular to the optical axis 16 of the output 12 of the diode laser 10 and positioned tangentially to the point on which the spherical front lens surface 26 contacts the optical axis 16 of the diode laser 10 is depicted in FIG. 3 for purposes of illustration and clarity.

In order to collimate the divergent diode laser output 12, the optical path lengths, defined as the refractive index multiplied by the physical path length, of the various rays must be identical. The rays which are traced through the hybrid lens 20 taken into account the amount by which light waves of the desired wavelength are defracted upon entering and exiting the lens 20 having a predetermined refractive index. Additionally, the binary optical pattern 24 to be etched upon the back surface 22 of the lens 20 is determined as a result of calculations equating the optical path differences of various light rays taking into account the amount by which entering light waves are defracted upon encountering the binary optical pattern 24. Thus, the goal of the subsequent optical path difference calculations is to determine the appropriate binary optical pattern 24 to ensure that the divergent input waveform 12 is collimated at the chosen collimation point or plane 40.

While rays may be traced for divergent output light 12 both above and below the optical axis 16, the diverging fan beam 12 of a diode laser 10 is typically vertically symmetric about the horizontal plane in which the active region 14 of the diode laser 10 is located so that rays need only be traced for the divergent output on one side of the optical axis 16. The binary optical pattern 24 of the back surface 22 of the lens 20 determined through the ray tracing on the one side of the optical axis 16 may thereinafter be relicated for the other side of the back lens surface 22. The binary optical pattern 24 will therefore be symmetric in profile about the optical axis 16.

While any number of rays which differ in their divergence angle from the emitting facet of the diode laser 10 may be traced with an enhanced optimization of the optical pattern 24 resulting from the tracing of an increased number of distinct rays, a finite number of rays is selected to simplify the computations. Typically, the use of one ray for each angle of divergence 50 above the optical axis 16 is sufficient, such as tracing 40 rays spaced apart by 1° in their initial divergence angles for a diode laser 10 with a 40° half-angle divergence. Alternatively, the spacing of the rays to be traced may be controlled by varying the height 52, above the optical axis 16, at which the rays enter the back lens surface 22 such that representative rays are traced over the entire back lens surface 22 which the laser output will illuminate.

Exemplary calculations may be performed for a pair of rays shown in FIG. 3 which are traced through a pair of adjacent lens, the first lens being a plano lens 30 having an index of refraction $n_p$ and the second lens being a plano convex cylindrical lens 32 having a radius R for the spherical front lens surface 26 and an index of refraction $n_L$. The hybrid lens 20 is located at a distance BFD, denoted 54, from the emitting facet of the diode laser 10 and the rays are diverging at an angle $\Theta_0$, denoted 50, from the optical axis 16, and entering the back lens surface 22 at a known height $H_3$, denoted 52, from the optical axis 16.

For the on axis ray the optical path length is calculated as:

$$OP_0 = n_L D + T n_p + BFD$$

wherein, D, denoted 56 in FIG. 3, is the thickness along the optical axis of the plano-convex lens 32 and T denoted 58, is the thickness of the plano lens 30.

Similarly, the total optical path length for the off axis ray is calculated by the first calculating the off axis ray's 4 components: $OP_1$, $OP_2$, $OP_3$, and $OP_4$ which are summed to determine the total optical path length. The first optical component $OP_1$, denoted 60, is the distance along a plane parallel to the optical axis 16 of the diode laser 10 from the spherical front lens surface 26 of the hybrid lens 20 to the collimation plane 40. The value of $OP_1$ may be calculated as follows:

$$OP_1 = ((1R)(H_1^2))/(1 + (1-(1/R)^2(H_1^2))^{\frac{1}{2}}).$$

As the aforementioned equation dictates $OP_1$ is a function of $H_1$, denoted 63, which is a measure of the height above the optical axis 16 of the diode laser 10 which the traced ray of light is collimated.

The second component of the off axis ray 62 is $OP_2$, denoted 64 in FIG. 3. $OP_2$ is a measure of the optical path length through the plano-convex lens 32. In order to calculate $OP_2$ several preliminary calculations must be made. Initially, $\Theta_3$, the angular displacement between a line parallel to the optical axis 16 and the path traced by the ray within the plano-convex lens 32, denoted 84 in FIG. 3, must be determined and is the difference between $\Theta_1$ and $\Theta_2$. $\Theta_2$, the angle between the path traced by the off-axis ray 62 as it proceeds through the plano-convex lens 32 and a line 78 from the center of the plano-convex lens 32 to the point at which the off-axis ray exits the lens 20, denoted 82 in FIG. 3, may be determined from Snell's Law as:

$$\Theta_2 = \arcsin((n_1 \sin \Theta_1)/(n_L))$$

wherein $n_1$ is the refractive index of the environment which the hybrid lens 20 is placed. Typically, this environment is air with a refractive index of 1.00. Additionally, $\Theta$, the angle between the optical axis 16 and a line 78 from the center of the plano-convex lens 32 to the point at which the off-axis ray 62 exits the plano-convex lens 32, denoted 80 in FIG. 3, may be determined as:

$$\Theta_1 = \arcsin(H_1/R)$$

so that $\Theta_3$ is then equal to $(\Theta_1 - \Theta_2)$. The change in the height above the optical axis that the light ray covers as it proceeds from the plano surface 36 of the plano-convex lens 32 to the convex existing surface 26 of the lens is noted $\Delta H_1$, denoted 74 in FIG. 3, and is calculated as:

$$\Delta H_1 = (\tan \Theta_3)(D - OP_1).$$

From these preliminary calculations $OP_2$ may be calculated as:

$$OP_2 = n_L(\Delta H_1^2 + (D - OP_1)^2)^{\frac{1}{2}}.$$

In a similar fashion $OP_3$, denoted 66, may be calculated. $OP_3$ is the optical path length that the light ray travels in going through the plano lens 30. Again several preliminary calculations must be made. By applying Snell's Law, $\Theta_4$, the angle between a horizontal line and the path traced by the off-axis 62 within the plano lens 30, denoted 86 in FIG. 3, may be calculated as:

$$\Theta_4 = \arcsin((n_L \sin \Theta_3)/n_p).$$

Once $\Theta_4$ is known, the change in height as the light ray proceeds through the plano lens 30, $\Delta H_2$, denoted 72 in FIG. 3, may be calculated as:

$$\Delta H_2 = T(\tan \Theta_4).$$

From these calculations $OP_3$ may be determined as:

$$OP_3 = n_p(\Delta H_2^2 + T^2)^{\frac{1}{2}}.$$

Finally, $OP_4$, denoted 68, the optical path length which the diverging light ray travels from its source to its entry in the back lens surface 22 is calculated as:

$$OP_4 = (BFD + H_3^2)^{\frac{1}{2}}$$

wherein $H_3$, denoted 52, which is the height above the optical axis 16 at which the diverging light ray enters the back lens surface 22, may be calculated as $H_3 = H_2 - \Delta H_2$ wherein $H_2$, denoted 70, in turn is calculated as:

$$H_2 = H_1 - \Delta H_1.$$

Once these 4 components are individually calculated, they may be summed to determine the total off axis path length for a diverging light ray. The resultant optical path difference between an off axis ray and an on axis ray may thus be determined as:

$$OPD = (OP_1 + OP_2 + OP_3 + OP_4) - OP_0.$$

The binary optical pattern 24 etched on to the back lens surface 22 of the plano lens 30 is in accordance with typical binary optical technology as determined by this optical path difference calculation. The planar binary optics surface pattern 24 etched onto the back lens surface on the plano lens 30 is performed in a manner which is well known to those skilled in the art. Details of such binary optic etching process may be found in an article in Laser Focus World, Aug. 1989, p. 47. Also further reference may be found in U.S. Pat. No. 4,846,552, issued to Veldkamp, et al which describes the generation of planar aspheric lens using binary optics technology. This patent by Veldkamp, et al is herein incorporated by reference.

The binary optics surface pattern 24 is an eight level phase structure which corrects for the optical path differences inherent in divergent light. By such correction, the light exiting the convex surface 26 of the hybrid lens 20 is collimated at the collimation plane 40 since all such light travels an equal optical path or an optical pattern which varies by an integer number $22\pi$ from this same optical path length. The eight level binary optics surface is shown schematically in FIG. 2.

In accordance with binary optics technology, the optical transformation affected by the binary optical surface 24 is encoded as a set of lithographic masks. The optical path differences of off axis rays of light calculated at various heights above the optical axis 16 upon their entry to the back lens surface 22 provides the necessary information in order to create the masks. While such calculations may be performed by successively utilizing the equations hereinbefore explained for varying heights above the optical axis 16, conventional optical raytrace computer programs may be utilized as well to reduce a wavefront phase map as is well known in the art. The generation of the eight-level etched binary optical surface as shown in FIG. 2 utilizes sequential exposure to a first, second, and third photo-lithographic mask with the first mask producing a two-phase level structure, the second mask producing a four-phase level structure and the third mask producing a eight-phase level structure.

The optical path difference calculated for varying heights $H_3$ above the optical axis 16 may be utilized to determine the width of the binary mask fringes or in other words, the period of the particular phase structure. Therefore, for the first mask which produces a two-phase level structure, the binary mask fringes are located where the equation $m\lambda = OPD$ is satisfied wherein M is an integer greater than or equal to zero. Thus, for m equal to zero and a lens used with a light source having a known wavelength, a fringe is located along the plane in which the optical axis lies and which is perpendicular to the planar back lens surface 22. This fringe, with m equal to zero, is placed on the optical axis since it is only at the optical axis that a lens that has not been optimized with a binary optics pattern 24 has an optical path difference of zero. Thereafter, the second fringe location is determined by setting m equal to 1 with the wavelength having the same constant value. The results of the aforementioned equations are analyzed to determine at what height above the optical axis, $H_3$, does the calculated optical path difference equal the product of m and the wavelength. Similar fringe determinations are performed for a constant wavelength value with m being set equal to increasing integer values, i.e. 2, 3, 4, . . . . These calculations are continued until the height above the optical axis at which the fringe is placed is above the height at which the diverging light input 12 strikes the back lens surface 22.

Based upon these fringe determinations, a first level mask is generated such that the mask covers the portion of the lens between every second pair of fringe locations. For example, the mask may be formed so as to be opaque in the regions between the fringes located at a value set by m equal to 0 and m equal to 1, between fringes located where m equals 2 and m equals 3, between fringes located where m equals 4 and m equals 5 and so forth in a like manner. Similarly, the region between fringes located at m equal to 1 and m equal to 2, between fringes located at m equals to 3 and m equals to 4, and so forth in a like manner is left exposed to the etchant.

A similar procedure for that described for a first phase level mask is utilized to form both the second and third masks. For the second mask, which produces four phase level structures the binary mask fringes are located at heights on or above the optical axis which satisfy the equation: $(m\lambda/2) = OPD$, for integer values of m greater than or equal to zero. These fringe locations subsequently determine the portions of the back lens surface 22 which are exposed to the etchant as previously described. Likewise, for the third mask which produces an eight-phase level structure, the binary mask fringes are located at heights on or above the optical axis which satisfy the equation: $(m\lambda/4) = OPD$. These fringe locations also serve to determine the portions of the back lens surface 22 which are exposed to the etchant as previously described in conjunction with the first phase level mask.

As previously discussed the binary optical pattern generated for that portion of the hybrid lens 20 above the optical axis 16 may be replicated for that portion of the lens 20 lying below the optical axis 16 due to the symmetrical light input 12.

Thus by utilizing a hybrid refractive/refractive lens 20 as hereinbefore described, an asymmetrically diverging beam of light 12 such as that from a laser diode 10 may be partially collimated and aberration corrected by a reactive ion etched binary lens element 24 on the back surface 22 of the lens 20 with final collimation being accomplished by refraction from the front spherical lens surface 26. Such a hybrid refractive/defractive lens 20 may also be easily assembled in dense two dimensional arrays without seams or dead zones between the lens elements so as to allow higher laser irradiance without the need for additional optical elements to collimate the output of a laser diode array.

Although there has been illustrated and described specific detail and structure of operations, it is clearly understood that the same were merely for purposes of illustration and that changes and modifications may be readily made therein by those skilled in the art without departing from the spirit and the scope of this invention.

We claim:

1. An optical lens for collimating a divergent input light, comprising:
    a) a substantially spherical front lens surface; and
    b) a substantially planar back lens surface having a binary optic diffractive element etched thereon wherein said back lens surface has been formed such that the optical path length travelled by each ray of said divergent input light from a source of said divergent input light to a predetermined collimation plane is substantially equal.

2. The optical lens as recited in claim 1 wherein said binary optic diffractive element is an eight phase level structure.

3. The optical lens as recited in claim 2 wherein said binary optic diffractive element is formed by means of reactive ion etching.

4. The optical lens as recited in claim 3 wherein said eight phase level structure of said binary optic diffractive element is formed by means of a first mask having a period of $m\lambda$, a second mask having a period of $m\lambda/2$, and a third mask having a period of $m\lambda/4$, wherein m is an integer greater than or equal to zero.

5. The optical lens as recited in claim 4 wherein $m\lambda$, $m\lambda/2$, and $m\lambda/4$ are each equal to the optical path difference of an on-axis ray, said on-axis ray tracing a pattern along said optical axis of said divergent input light, and an off-axis ray, said off-axis ray entering said back lens surface at an equivalent height above the optical axis of said divergent input light as the height at which the eight level phase structure is placed.

6. The optical lens as recited in claim 1 wherein said optical lens further comprises:
    a) a plano-convex lens element having a planar side and a convex side; said convex side forming said substantially spherical front lens surface; and
    b) a plano lens element forming said substantially planar back lens surface wherein said substantially planar back lens surface has said binary optic diffractive element etched thereon; said plano lens element being positioned adjacent to said planar side of said plano-convex lens element.

7. The optical lens as recited in claim 6 wherein said plano lens element is adhesively attached to said planar side of said plano-convex lens element.

8. The optical lens as recited in claim 7 wherein said binary optic diffractive element is an eight phase level structure.

9. The optical lens as recited in claim 8 wherein said binary optic diffractive element is formed by means of reactive ion etching.

10. The optical lens as recited in claim 9 wherein said eight phase level structure of said binary optic diffractive element is formed by means of a first mask having a period of $m\lambda$, a second mask having a period of $m\lambda/2$, and a third mask having a period of $m\lambda/4$, wherein m is an integer greater than or equal to zero.

11. The optical lens as recited in claim 10 wherein $m\lambda$, $m\lambda/2$, and $m\lambda/4$ are each equal to the optical path difference of an on-axis ray, said on-axis ray tracing a pattern along said optical axis of said divergent input light, and an off-axis ray, said off-axis ray entering said back lens surface at an equivalent height above an optical axis of said divergent input light as the height at which the eight level phase structure is placed.

12. A method of producing a collimated output beam of light from a divergent input light source comprising the steps of:
    a) providing a plano-convex lens having a first planar side forming a back lens surface and a substantially spherical second convex side forming a front lens surface; said planar side having a binary optic diffractive element etched thereon; and b) directing said divergent input light source at said first planar side of said plano-convex lens such that the optical axis of said divergent input light source is positioned substantially through the center of said plano-convex lens.

13. A method of producing a collimated output beam of light from a divergent input light source as recited in claim 12 wherein said binary optic diffractive element etched upon said planar side of said plano-convex lens is an eight-level phase structure.

14. A method of producing a collimated output beam of light from a divergent input light source as recited in claim 13 wherein said divergent input light source is produced by a laser.

15. A method of producing a collimated output beam of light from a divergent input light source as recited in claim 14 wherein said divergent input light source is produced by a semiconductor laser.

16. A method of producing a collimated output beam of light from a divergent input light source as recited in claim 15 wherein said plano-convex lens further comprises:

a) a plano-convex lens element having a planar side and convex side; said convex side forming said substantially spherical front lens surface; and b) a plano lens element forming said substantially planar back lens surface; said plano lens element being positioned adjacent to said planar side of said plano-convex lens element.

17. The optical lens as recited in claim 16 wherein said plano lens element is adhesively attached to said planar side of said plano-convex lens element.

* * * * *